United States Patent Office 2,913,501
Patented Nov. 17, 1959

2,913,501

CHROMATOGRAPHIC PURIFICATION OF HIGHER FATTY ALCOHOLS

Joseph James Cahill, Jr., Colonia, N.J., assignor to Colgate-Palmolive Company, New York, N.Y., a corporation of Delaware No Drawing. Application March 12, 1956
Serial No. 570,697

4 Claims. (Cl. 260—643)

The present invention relates to a process for chromatographically purifying higher fatty alcohols. More particularly the invention is directed to a method whereby the higher fatty alcohol content of a solution of a crude or impure higher fatty alcohol is selectively adsorbed by an adsorbent material and then eluted or desorbed therefrom.

Higher fatty alcohols find extensive use as raw materials for the manufacture of various synthetic detergents, the most important of which, in terms of tonnages, are the alkyl sulfates or fatty alcohol sulfates. These alcohols are also added to alkyl sulfate detergent compositions to improve detergency and to increase and stabilize foam. For such purposes it is highly desirable that a relatively pure higher fatty alcohol be employed because various adulterant side-products found in crude or imperfectly purified alcohols adversely affect alkyl sulfate detergent properties.

In accordance with the present invention a process of purifying a higher fatty alcohol of 10–18 carbon atoms containing as impurities a total of 2–50% of a mixture of compounds of formulas RH, ROR' and R"COOR, where R and R' are fatty alkyl radicals of 10–18 carbon atoms and R" is a fatty alkyl radical of 9–17 carbon atoms, comprises contacting an activated alumina adsorbent with a solution of the impure higher fatty alcohol and, in the presence of the higher fatty alcohol and impurity, also contacting the activated alumina adsorbent with a solvent selected from the group consisting of carbon tetrachloride and benzene to effect the adsorption of higher fatty alcohol and solution of impurity in said solvent, separating the solution of impurity in said solvent from the adsorbent and desorbing the adsorbed purified fatty alcohol with a monohydric alcohol of 1–3 carbon atoms, whereby a lower alcohol solution of higher fatty alcohol is obtained free of the aforementioned impurities. Usually the amount of named impurity left in the purified fatty alcohol is less than 0.5% by weight.

Particularly, a process of purifying impure tallow alcohol containing, as impurities, a total of 4–20% of a mixture of RH, ROR' and R"COOR, where R and R' are fatty alkyl radicals of 10–18 carbon atoms and R" is a fatty alkyl radical of 9–17 carbon atoms, comprises contacting an activated alumina adsorbent with a solution of the impure tallow alcohol in carbon tetrachloride to selectively adsorb the tallow alcohol while allowing the said impurities to remain dissolved in the solvent, separating the carbon tetrachloride solution of impurities from the adsorbent and desorbing the adsorbed purified tallow alcohol with ethanol, whereby an ethanol solution of tallow alcohol is obtained substantially free of the aforementioned impurities.

When it is desired that the impurities contained in the crude alcohol be separated from each other a further embodiment of the invention may be advantageously employed. In this process an impure higher fatty alcohol of 10–18 carbon atoms containing, as impurities therein, a total of 2–50% of a mixture of RH, ROR' and R"COOR, may be purified by contacting activated alumina with a solution of the impure higher fatty alcohol in a solvent from which the adsorbent is capable of adsorbing higher fatty alcohol and at least one of the aforementioned impurities, separating the adsorbent from the non-adsorbed solution and successively eluting with suitable solvents selected from the group consisting of petroleum ether, e.g., that cut boiling between 95° F. and 140° F., benzene, carbon tetrachloride and suitable low molecular weight polar organic compound capable of desorbing the higher fatty alcohol and collecting the washes separately to separate the higher fatty alcohol from the adsorbed impurity.

Throughout this specification the letters R, R', R" and Z have the single meaning already given.

The words "impure" and "crude" are used to describe those alcohols containing 2–50% of a total of compounds of the group consisting of RH, ROR' and R"COOR, the "impurities," which are the starting materials in the invented chromatographic processes. RCHO and RSOOR' may also be present in addition to the above impurities. No reference to accepted grades of chemicals or to fitness for human use or consumption should be inferred. The words "impure" and "crude" are used to permit a differentiation between the described starting materials and the products of the invented process.

In a like manner the verb purify has been employed to denote the act of removing a named "impurity" from the impure higher fatty alcohol. The word "pure," used alone, means relatively pure rather than absolutely pure. Generally the "pure" higher fatty alcohols contain less than ½% of the named impurities.

In a typical process the crude higher fatty alcohol, e.g., tallow alcohol, containing 2–50% impurities, is initially dissolved in a solvent of the group consisting of petroleum ether, carbon tetrachloride and benzene. The choice of solvent depends on the composition of the crude alcohol, more specifically on the impurities contained.

Thus, a solution of crude alcohol in any of the above solvents may be contacted with the adsorbent when it is desired to separate fatty hydrocarbon impurity, RH, from the fatty alcohol. In that case the fatty alcohol is adsorbed by the adsorbent material while the hydrocarbon remains in solution. Solution and adsorbent are then easily separated by any usual method, settling, filtration, centrifugation or pressing, and fatty alcohol is recovered by desorption with a low molecular weight polar organic compound capable of desorbing higher fatty alcohol from adsorbent.

Such an organic compound is an alcohol of low molecular weight, e.g., ethanol, methanol, isopropanol.

Also, in the particular system comprising petroleum ether, higher fatty alcohols and 2–50% of the aforementioned impurities it has been found that higher fatty ether impurities of formula ROR' are adsorbed by the activated alumina but it has also been discovered that they can be eluted from the adsorbent by additional amounts of petroleum ether. Therefore, it is possible to separate fatty hydrocarbon and fatty ether impurities by the present method. It is only necessary that one be able to determine the proper amount of solvent to employ to wash out the hydrocarbon, and then to desorb the fatty ether. This can be done empirically or the effluent can be continuously analyzed by any of the various analytical devices available, e.g., refractometer, infra-red spectrometer.

If the crude alcohol contains a higher fatty ester of the type R"COOR such ester is not adsorbed from a carbon tetrachloride or benzene solution although these esters are adsorbed from crude alcohols dissolved in petroleum ether. It is possible to separate the higher fatty alcohols from the esters by adsorbing only the fatty alcohols from benzene and carbon tetrachloride solutions of crude alcohols and subsequently desorbing the alcohols.

Sometimes sulfones of the formula RSOOR' are present in impure fatty alcohols recovered as unreacted material in sulfation processes. It has been established by experimental work that these compounds exhibit a chromatographic behavior similar to that of the esters discussed above. They may be separated from the esters by adsorption of both materials from a petroleum ether solution of impure alcohol followed by careful elution with benzene or carbon tetrachloride. The ester is washed out first and the sulfone can be removed from the adsorbent by using more solvent.

Aldehydes of the formula RCHO are adsorbed from impure higher fatty alcohols in a manner similar to that of esters and sulfones. Careful elution of a mixture of adsorbed aldehydes, sulfones and esters with carbon tetrachloride or benzene can result in a separation of the components. If desired, a second adsorption and elution process will give an even finer division.

The above description illustrates how one may purify higher fatty alcohols, of the type described, of specific classes of contaminants. One or more contaminants can be removed from the alcohol by this process and impurities can be separated from each other.

In a preferred process of the invention impure higher fatty alcohol containing hydrocarbon, fatty ether and fatty ester is dissolved in petroleum ether and the solution is contacted with activated alumina adsorbent. The ether, ester and alcohol are adsorbed, while the hydrocarbon remains in the solvent. Subsequently the fatty ether is desorbed by an additional petroleum ether wash, the ester is desorbed by either benzene or carbon tetrachloride, and the fatty alcohol is washed from the adsorbent with a suitable low molecular weight polar organic compound, e.g., ethanol.

Where the contaminants are of little commercial value so that their recovery as by-products of this process is uneconomical, it has been found desirable to use a solvent for the crude alcohol other than petroleum ether. In those cases the crude alcohol is dissolved first in carbon tetrachloride after which it is contacted with adsorbent to adsorb the fatty alcohol. Then the solution of impurities is removed from the adsorbent and the fatty alcohol is readily desorbed by low molecular weight monohydric alcohol. Benzene may be substituted for carbon tetrachloride in the above process; it is generally a better solvent for organic compounds and therefore finds use where the crude alcohol is not as soluble as desirable in carbon tetrachloride. However, partial suspensions or emulsions of crude alcohol in solvent (included within the scope of the term solutions) may also be employed so carbon tetrachloride may find use even where the crude alcohol is not completely soluble therein.

The melt or solution of crude alcohol is referred to as crude liquid alcohol. It should be fluid enough at the time of contact with the adsorbent to maintain an active interface between the liquid and the adsorbent. Adsorption may be brought about by dispersing the adsorbent in the fluid crude higher fatty alcohol, by passing the the alcohol through a volume or column of the adsorbent material, or by passing the adsorbent through a volume of fluid crude higher fatty alcohol. Desorption may be effected in a similar manner. It is preferred to conduct the invented processes at about room temperature (60° F.–100° F.).

After separation of components of a crude higher fatty alcohol by the invented process there will be obtained various solutions of the component compounds. The dissolved materials may be recovered by the usual evaporation, distillation and separation techniques known to the art.

Activated alumina is the only adsorbent that has been found suitable for the described purification of higher fatty alcohol. The alumina used may be of an appropriate degree of adsorbing power for the purification of the particular impure fatty alcohol. Alumina of the degree of activation resulting from heating it to 400° F. has been found satisfactory but the use of alumina having other activities is also within the invention. A suitable activated alumina of 80–200 mesh (U.S. Sieve series) is available from the Fischer Scientific Co. (Catalog No. A–540). After desorption and reactivation according to standard procedure the alumina may be recycled.

Because alumina is somewhat basic it has been found to split methyl esters of higher fatty acids when those materials are present in a crude fatty alcohol. However, esters of the formula R"COOR are not appreciably split by alumina. Should methyl esters of higher fatty acids, of formula R"COOCH$_3$, be present in the crude alcohol part of the methyl esters will be converted to fatty acid which will not be desorbed from the adsorbent by the preferred desorbents, the lower monohydric alcohols. It is seen that methyl esters will not hinder separation of higher fatty alcohols from their contaminants but will eventually deactivate the adsorbent, unless more polar desorbers, such as acetic acid, are employed.

Among the crude higher fatty alcohols that may be purified by this method it is preferred to use mixtures obtained from the treatment of tallow or methyl esters of tallow alcohols with hydrogen according to the known methods of making tallow alcohol, but coconut and hydrogenated coconut alcohols, as well as other fatty alcohols of 10–18 carbon atoms may be purified. Usually the alcohol content of these impure materials will consist almost entirely of saturated alcohols but those alcohols having no more than two double bonds in the molecule may also be present. By virtue of the production method employed these crude alcohols generally contain 2–50% of a mixture of long chain hydrocarbons, ethers and esters of formulas RH, ROR' and R"COOR respectively, and most often, between 4 and 20%. Since the invented processes can result in almost quantitative separation commercially they are capable of decreasing the impurity content of higher fatty alcohol containing as little as a total of ½% of the named impurities.

The solvents and eluents for the crude higher fatty alcohols permit selective adsorption and desorption from these compositions. They are specific for particular components of the described impure alcohols and must be employed as taught in this specification in order to obtain satisfactory separations and purifications. Processes similar to those described might find use in separating other mixtures of organic compounds but none of these is included within the invention because in chromatography the change of an ingredient in a composition may disrupt the order of chromatographic properties. Similarly a change of proportions, even where there is no ingredient change, will often upset a chromatographic balance and cause alteration of a separation method; consequently the present teachings should not be considered extendable to mixtures of ROH, ROR', R"COOR and RH where the ROH content is below 50% by weight.

The eluent for the higher fatty alcohol adsorbed on the adsorbent is a suitable polar organic compound of low molecular weight. By suitable it is meant that such a compound is capable of desorbing the higher fatty alcohol. These compounds are characterized by good desorbing properties and, in addition, should be readily distilled off the adsorbent so that they may be easily recovered, and the adsorbent can be reactivated without difficulty. Preferred eluents for the adsorbed higher fatty alcohol are the aliphatic monohydric alcohols of 1–3 carbon atoms, e.g., ethanol, isopropanol, methanol. Of these the best is ethanol.

The suitable lower polar organic compounds will also desorb ROR' and R"COOR so if a separation of these compounds from the pure higher fatty alcohol is desired they should be washed off the adsorbent with the particular solvents already described before treatment of the adsorbent with polar desorbent.

Processing conditions are not critical. Reaction temperatures, mixing techniques, liquid fatty alcohol viscosity, adsorbent particle size and time of contact between solution and adsorbent and eluent and adsorbent may all be varied as is customary in the general chromatographic art to obtain optimum results, provided that sufficient contact is made to permit a high degree of adsorption or desorption and the solution of liquid and adsorbent can be readily separated. The proportion of solvent to crude higher fatty alcohol may be varied but usually the amount of solvent employed will be considerably greater than the amount of crude alcohol in order to obtain proper adsorption of the alcohol and non-adsorption of an impurity.

The process may be conducted batchwise or continuously. In both cases a recycling of adsorbent and solvents is economically desirable.

Purified higher fatty alcohols find important uses in the formulation of certain synthetic detergents. Experimental work has shown that alkyl sulfates free of higher fatty hydrocarbons and higher fatty ethers possess greater foam stability under washing conditions than do alkyl sulfates containing these contaminants. The present process allows one to produce a higher alcohol of excellent quality. The purity of the resulting alcohol and the completeness of the separations obtained are such that the present process may be quantitative if operations are conducted with care.

In order to indicate even more fully the nature of the invention the following specific examples of the invented processes are given. These examples are intended to be only illustrative and do not limit the scope of the invention. All examples illustrate processes conducted at room temperature (60° F.–100° F.). All parts and percentages in the examples and the rest of the specification and claims are by weight unless otherwise indicated.

*Example I*

274.4 parts of a crude tallow alcohol containing fatty hydrocarbon, ether and ester impurities were dissolved in approximately 1900 parts of petroleum ether (boiling range 95–140° F.). The solution was allowed to percolate through a column of activated alumina containing 4000 parts of activated alumina of 80–200 mesh particle size, Fischer Scientific Company Catalog No. A–540. The impurities contained in the crude alcohol were eluted successively with various solvents. The fractions were collected and concentrated, after which they were identified by infra-red analyses. The following table shows the process and the separation of constituent materials:

| Fraction (In Order) | Eluent | Amount of Eluent | Amount Constituent Recovered | Infra-Red Analysis |
|---|---|---|---|---|
| 1 | petroleum ether (B.P. 95–140° F.) | 3,800 | 7.1 | fatty hydrocarbon. |
| 2 | ---do--- | 7,600 | 1.8 | fatty ether. |
| 3 | benzene | 4,400 | 18.8 | fatty ester. |
| 4 | ethanol | 8,000 | 248.3 | fatty alcohol. |

From the above table it may be calculated that the crude fatty alcohol contained 2.6% fatty hydrocarbon (RH), 0.6% fatty ether (ROR′), 6.8% fatty ester (R″COOR) and 90% fatty alcohol (ROH). The total weight of constituents recovered, within the limits of experimental error, was equal to the weight of crude alcohol employed.

*Example II*

A known mixture of fatty $C_{12}$, $C_{14}$, $C_{16}$, $C_{18}$ hydrocarbons, esters, ethers and alcohols was prepared to resemble commercial tallow alcohols. Thus, this mixture contained 65% $C_{18}$, 30% $C_{16}$, 4% $C_{14}$ and 1% $C_{12}$ compounds.

In three separate experiments, from 1–2 parts of the alcohol dissolved in petroleum ether was contacted with 35 parts of activated alumina (activated at 400° F.) and eluted with 220 parts of petroleum ether (B.P. 95–140° F.) followed by 320 parts carbon tetrachloride, followed by 120 parts ethanol. The following table illustrates the mixture employed and the separation obtained. The gain shown under Analysis I is within the range of experimental error.

| Component | Synthesis | Eluent | Analysis I | Analysis II | Analysis III |
|---|---|---|---|---|---|
| hydrocarbons | 0.8 | petroleum ether | 0.7 | 0.9 | 0.8 |
| ester-ether mixture | 0.8 | carbon tetrachloride | 1.0 | 0.9 | 1.1 |
| alcohol (by difference) | 98.4 | ethanol | 98.3 | 98.2 | 98.1 |
| unrecovered material | | | +1.7 | −1.9 | −1.1 |
| recovery | | | 101.7 | 98.1 | 98.9 |

*Example III*

4.862 parts of crude tallow alcohol were dissolved in 160 parts of benzene and mixed with 200 parts of activated alumina (Fischer No. A–540). This mixture was stirred for about 5 minutes and then allowed to stand for one hour. The benzene was separated from the adsorbent by filtration and the adsorbent was washed with 40 parts of benzene and the washings were added to the filtrate. Subsequently the adsorbent was washed with about 160 parts of ethyl alcohol. The benzene and alcohol solutions obtained were evaporated to dryness. 4.242 parts of a pure tallow alcohol were obtained from the ethanol solution, or 87.5% of the crude alcohol. The benzene fraction yielded a total of 30 parts of impurities (RH, ROR′, R″COOR), or 6.2% of the crude. Total recovered material comprised 93.7% of the impure tallow alcohol.

*Example IV*

The ether solubles, obtained from a cosulfonation process wherein alkyl benzene was sulfonated and 1-octadecanol was sulfated, were separated and chromatographed according to the general procedure shown in Example I. 310.8 parts of this material were dissolved in petroleum ether and placed on a column containing 6,000 parts of activated alumina (activated at 400° F.) already wet with petroleum ether (B.P. 95° F.–140° F.). The following table shows the separation method and results of its employment.

| Fraction (In order) | Eluent | Amount of Eluent | Amount Constituent Recovered (Dry) | Infra-Red Analysis |
|---|---|---|---|---|
| 1 | petroleum ether (B.P. 95–140° F.) | 7,500 | 45.2 | fatty hydrocarbon. |
| 2 | ---do--- | 7,500 | 11.3 | fatty ether. |
| 3 | benzene | 8,800 | 36.7 | organic sulfur compound. |
| 4 | ---do--- | 8,800 | 3.8 | Do. |
| 5 | ethanol | 7,900 | 174.6 | tallow alcohol. |
| 6 | ---do--- | 7,900 | 2.5 | Do. |

The sulfur fractions, numbers 3 and 4, were not separated from the accompanying esters in this particular experiment. Such a separation can be effected by eluting the ester from a column or slurry of adsorbent with benzene until the yellow color, characteristic of the sulfones, just begins to appear in the eluent. The remaining adsorbate will contain the sulfones which are removable by additional washing with benzene.

In the above example, 56% of the cosulfonation mix ether-solubles was recovered as tallow alcohol. Total recovery was 88%.

*Example V*

A 70% tallow alcohol (containing 30% impurities) was made by mixing a 94% tallow alcohol (containing 6% of impurities comprising fatty ethers, esters and hydrocarbons of formulas ROR′, R″COOR and RH) with a mixture of ROR′, R″COOR and RH where R, R′ and R″ were from 15–18. 2.00 parts of the 70% tallow alcohol were dissolved in 320 parts carbon tetrachloride and the solution was mixed with 40 parts Fischer A-540 alumina. After stirring 5 minutes the resulting slurry was allowed to stand for about an hour, after which it was filtered.

The filtrate was collected and evaporated to dryness. It contained 0.66 part dry material (impurities). The adsorbent was washed with 200 parts ethyl alcohol and the ethyl alcohol solution obtained was evaporated to a residue of 1.32 parts by weight. Infra-red analysis proved the residue to be tallow alcohol of high purity.

The above invention has been described in conjunction with various illustrative examples of the invented processes. It will be obvious to those skilled in the art that other variations and modifications of the invention can be made and various equivalents can be substituted therein without departing from the true spirit of the invention and the principles disclosed or going outside the scope of the specific case or the purview of the claims.

I claim:

1. A process of purifying a higher fatty alcohol of 10–18 carbon atoms containing as impurities a total of 2–50% of a mixture of compounds of formulas RH, ROR' and R"COOR, where R and R' are fatty alkyl radicals of 10–18 carbon atoms and R" is a fatty alkyl radical of 9–17 carbon atoms, which comprises contacting an activated alumina adsorbent with a solution of the impure higher fatty alcohol and, in the presence of the higher fatty alcohol and impurity, also contacting the activated alumina adsorbent with a solvent selected from the group consisting of carbon tetrachloride and benzene to effect the adsorption of higher fatty alcohol and solution of impurity in said solvent, separating the solution of impurity in said solvent from the adsorbent and desorbing the adsorbed purified fatty alcohol with a monohydric alcohol of 1–3 carbon atoms, whereby a lower alcohol solution of higher fatty alcohol is obtained free of the aforementioned impurities.

2. A process of purifying a higher fatty alcohol of 10–18 carbon atoms containing as impurities a total of 2–50% of a mixture of compounds of formulas RH, ROR' and R"COOR, where R and R' are fatty alkyl radicals of 10–18 carbon atoms and R" is a fattly alkyl radical of 9–17 carbon atoms, which comprises contacting an activated alumina adsorbent with a solution of the impure higher fatty alcohol in carbon tetrachloride to selectively adsorb the fatty alcohol while allowing the said impurities to remain dissolved in the solvent, separating the carbon tetrachloride solution of impurities from the adsorbent and desorbing the adsorbed purified fatty alcohol with a monohydric alcohol of 1–3 carbon atoms, whereby a lower alcohol solution of higher fatty alcohol is obtained free of the aforementioned impurities.

3. A process of purifying a higher fatty alcohol of 10–18 carbon atoms containing as impurities a total of 2–50% of a mixture of compounds of formulas RH, ROR' and R"COOR, where R and R' are fatty alkyl radicals of 10–18 carbon atoms and R" is a fatty alkyl radical of 9–17 carbon atoms, which comprises contacting an activated alumina adsorbent with a solution of the impure higher fatty alcohol in benzene to selectively adsorb the fatty alcohol while allowing the said impurities to remain dissolved in the solvent, separating the benzene solution of impurities from the adsorbent and desorbing the adsorbed purified fatty alcohol with a monohydric alcohol of 1–3 carbon atoms, whereby a lower alcohol solution of higher fatty alcohol is obtained free of the aforementioned impurities.

4. A process of purifying tallow alcohol containing as impurities a total of 2–50% of a mixture of RH, ROR' and R"COOR where R and R' are fatty alkyl radicals of 10–18 carbon atoms and R" is a fatty alkyl radical of 9–17 carbon atoms, which comprises contacting an activated alumina adsorbent with a solution of the impure tallow alcohol in petroleum ether to adsorb the pure tallow alcohol, ROR' and R"COOR, separating the adsorbent from the non-adsorbed solution of RH and successively eluting the adsorbent, first with additional petroleum ether to remove the ROR' from the adsorbent and then with a member of the group consisting of carbon tetrachloride and benzene to remove the R"COOR from the adsorbent, collecting and segregating the washings to separate the said impurities, and then desorbing the adsorbed purified tallow alcohol with ethanol, whereby a tallow alcohol solution in ethanol is obtained free of the aforementioned impurities.

References Cited in the file of this patent

UNITED STATES PATENTS

| | | |
|---|---|---|
| 2,487,574 | Meng | Nov. 8, 1949 |
| 2,591,699 | Hess et al. | Apr. 8, 1952 |
| 2,619,497 | Hockberger | Nov. 25, 1952 |
| 2,621,203 | Cope | Dec. 9, 1952 |
| 2,726,269 | Humphlett | Dec. 6, 1955 |
| 2,760,993 | Chang | Aug. 28, 1956 |

FOREIGN PATENTS

| | | |
|---|---|---|
| 1,044,616 | France | June 24, 1953 |

OTHER REFERENCES

Strain, "Chemical Analysis," vol. 2, Interscience, N.Y., 1945; pp. 1–15, 29–32, 41–6, 53–7, 65–8, 71–6, 85, 87, 89–91, 97–103.

Cassidy: Tech. of Org. Chem., vol. V, "Adsorption and Chromatography" (1951) pp. 189, 294–9.